UNITED STATES PATENT OFFICE.

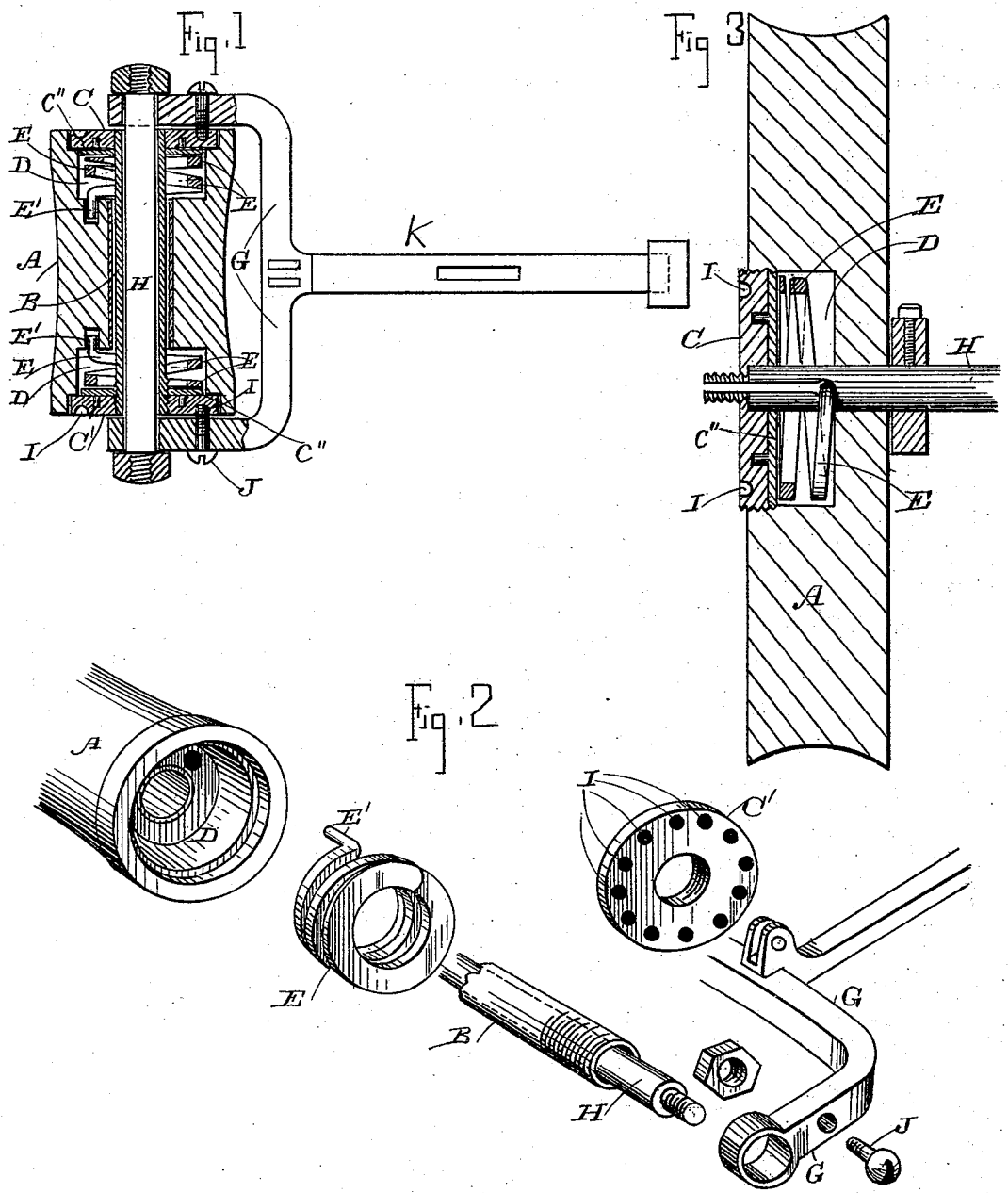

HENRY C. FINKLER, OF SAN FRANCISCO, CALIFORNIA.

ROLLER-BRAKE.

SPECIFICATION forming part of Letters Patent No. 488,066, dated December 13, 1892.

Application filed August 29, 1892. Serial No. 444,495. (No model.)

*To all whom it may concern:*

Be it known that I, HENRY C. FINKLER, a citizen of the United States, residing in the city and county of San Francisco, State of California, have invented an Improvement in Roller-Brakes; and I hereby declare the following to be a full, clear, and exact description of the same.

My invention relates to a device which I call a "roller-brake." It consists of a roller adapted to rotate with or upon a shaft and having adjustable frictional end plates by which the pressure upon the roller may be regulated and the amount of friction upon its contacting surface increased or diminished, and in certain details of construction, which will be more fully explained by referene to the accompanying drawings, in which—

Figure 1 is a longitudinal section of my device. Fig. 2 is a view showing the parts separated. Fig. 3 is a modification of my invention.

The object of my invention is to provide a braking device in which the wearing friction is removed from the contacting surfaces and transferred to other surfaces which are less liable to damage or constant wear and which are easily removed at any time, and it is especially applicable for use upon brakes which are applied to surfaces easily injured, as in the case of rubber bicycle-tires, wire cables, ropes, and other similar surfaces.

A is a roller the surface of which is adapted to fit the surface to which it is to be applied. In the present case I have shown the device adapted as a brake upon bicycle-tires and the springs movable with the roller, while the frictional disks are stationary; but it will be manifest that the springs may be fixed to the shaft and the disks made movable with the roller with the same result. Through the center of this roller passes a sleeve B, having adjustable disks upon each end or, what is preferable, one disk C fixed upon one end and the other adjustable, as shown. Each disk fits into a countersunk opening in the end of the roller, and interior to this disk is a chamber D, of considerably larger diameter than the sleeve. Within this chamber, at one or both ends, is fitted a strong elastic spiral spring E, having one end bent to stand at right angles with its face, as shown at E'. This end enters a hole in the bottom of the chamber in the roller within which the spring lies, and is thus locked, so as to rotate with the roller about the sleeve, which it surrounds. Upon the opposite end of the sleeve screw-threads are cut, and upon these threads is fitted the second disk C', which may be screwed upon the threads, so as to press with any desired force against the end of the spring, which is flattened, so as to present a wide flat surface of contact against the face of the disk. It will be manifest that any tension produced by screwing this disk upon the sleeve will cause the springs at each end to press with their flat faces against their corresponding disks, thus producing a friction which may be increased or decreased at will by the movement of the adjusting-disk.

As before stated, both disks may be made adjustable by having screw-threads upon opposite ends of the sleeve; but it is preferable for simplicity to have one of the disks fixed to the end of the sleeve and the adjustment all made at one end, as it will be transmitted to both springs on account of the sleeve moving freely within the roller.

G is a yoke the ends of which are perforated to receive the shaft H, which passes through the ends of the yoke and through the sleeve and its disks and is secured by a nut or other fastening.

Each adjusting-disk has a series of holes I made in it near its periphery, and through each arm of the yoke a hole is made to receive a screw J, which is adapted to enter either of the holes in the disk. When this screw is withdrawn, the disk may be turned to increase or decrease the pressure upon the frictional springs by means of a tool having a fork or lugs at the end, which will enter the holes in the disk and serve as a screw-driver to rotate it. After the proper degree of tension has been secured the screw is again introduced into the hole in the disk which stands opposite the hole in the yoke, and the disk is thus retained in place.

The operation will then be as follows: When the surface of the roller is forced against the surface to which the brake is to be applied, the roller will rotate upon the sleeve, and as the springs in the chambers at each end are connected with it by the projecting ends it will be manifest that these springs will also be caused to rotate with the roller. The springs are made of heavy steel wire, and the outer faces being ground flat they present considerable frictional surface, which lies in contact with the disks C and C' at each end of the sleeve, and as the sleeve and disks are prevented from rotation by being locked within the yoke which carries the roller it will be manifest that this friction is rendered efficient for checking the movement of the contacting surfaces of the roller and the wheel to which it is applied.

This device may be mounted upon any movable framework by which the roller can be brought into contact with the opposing surface or removed therefrom. As used for a brake, the yoke has an arm K extending outwardly from its center, this arm being suitably fulcrumed to some part of the machine or apparatus and having a connecting-lever or other device by which it is moved about its fulcrum in the usual manner for brakes or similar devices. It will be manifest that the amount of friction upon the meeting surfaces of the springs and the disks may be increased to such an extent that the roller would remain stationary and slide like any brake upon the surface to which it is applied; but the object of the device is to allow the roller to rotate in contact with the opposing surface, and thus prevent all injurious wear between these surfaces and transfer the frictional wear to the springs and disks, which are easily renewed at any time.

The roller may be made of any suitable or desired material, either hard wood, compressed paper, rawhide, metal, or other material.

It will be manifest that supplemental wear-plates or washers C'' may be attached to the faces of the disks C C' by means of short lugs and corresponding holes, these wear-plates being easily replaced when worn out by the friction of the ends of the harder steel springs, and the more expensive disks may be saved.

Having thus described my invention, what I claim as new, and desire to secure by Letters Patent, is—

1. A brake comprising a roller having a central hole and chambered ends, elastic springs fitting into the chambers at the ends of the roller, a sleeve passing through the center of the roller and the springs, disks at its ends against which the outer faces of the springs contact, one of said disks being movable and the other stationary, a pin or shaft passing through the sleeve, and a yoke or support in which the pin is mounted, and locking devices whereby one of the frictional surfaces is prevented from rotation, substantially as herein described.

2. A brake comprising a roller the surface of which is adapted to contact with the opposing surface which is to be held or checked, a pin passing through the center of the roller and a yoke or support in which said pin is fixed, a sleeve surrounding said pin, turning loosely thereon and within the roller, said roller having chambers formed in its ends surrounding the sleeve, elastic springs fitting said chambers and connected with the roller, so as to rotate therewith, disks upon the outer ends of the sleeves, against which the outer faces of the springs contact, said disks having holes or notches formed in them, and pins passing through the supporting-yoke and engaging said notches, whereby the disks and sleeve are prevented from rotating with the roller and springs, substantially as herein described.

3. A brake comprising a roller having a central opening and chambers formed around it in the opposite ends, a sleeve passing through said opening, disks upon the outer ends of the sleeve, springs fitting the chambers of the roller interior to the disks and connected with the roller, so as to rotate therewith, and having their exterior faces adapted to frictionally contact with the disks, a yoke, and a pin passing through the ends of the yoke and through the sleeve, whereby the roller is supported and moved to contact with the opposing surface or to be retracted therefrom, said yoke and disks having holes made through them, and pins by which the disks are locked at any point of adjustment, substantially as herein described.

4. A brake comprising a roller adapted to have a rolling contact with an opposing surface and turning upon a shaft, said roller having a chamber in its end, a spiral spring fitting said chamber, and a disk adjustable with relation to the spring and chamber and having frictional contact with the end of the spring, said spring and disk being arranged in a manner whereby one is movable with the roller and the other locked to the shaft, substantially as herein described.

In witness whereof I have hereunto set my hand.

HENRY C. FINKLER.

Witnesses:
  S. H. NOURSE,
  GEO. H. STRONG.